US011558338B1

(12) United States Patent
Bravmann et al.

(10) Patent No.: US 11,558,338 B1
(45) Date of Patent: *Jan. 17, 2023

(54) SYSTEM AND METHOD FOR SECURING INFORMATION PROVIDED VIA A SOCIAL NETWORK APPLICATION

(71) Applicant: Charles Schwab & Co., Inc., San Francisco, CA (US)

(72) Inventors: Kenneth M. Bravmann, Pleasanton, CA (US); Benjamin N. Mattias, Kållered (SE); Jeffrey M. Weaver, Austin, TX (US); Sandeep Reddy Chelamacherla Anand, Denver, CO (US); John Murphy, San Anselmo, CA (US); Charles E. Gotlieb, San Francisco, CA (US)

(73) Assignee: Charles Schwab & Co., Inc., Southlake, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/688,777

(22) Filed: Aug. 28, 2017

Related U.S. Application Data

(63) Continuation of application No. 14/145,872, filed on Dec. 31, 2013, now Pat. No. 9,769,108.

(60) Provisional application No. 61/748,057, filed on Dec. 31, 2012.

(51) Int. Cl.
*G06F 15/16* (2006.01)
*H04L 51/52* (2022.01)
*G06F 15/173* (2006.01)

(52) U.S. Cl.
CPC .................................. *H04L 51/52* (2022.05)

(58) Field of Classification Search
CPC ......... H04L 51/32; H04L 51/12; H04L 67/10; G06Q 40/00; G06Q 50/01
USPC .......................................................... 709/206
See application file for complete search history.

(56) References Cited

U.S. PATENT DOCUMENTS

| | | | | |
|---|---|---|---|---|
| 2009/0288150 | A1* | 11/2009 | Toomim | G06F 21/6218 726/5 |
| 2010/0174709 | A1* | 7/2010 | Hansen | G06F 16/9537 707/728 |
| 2011/0125894 | A1* | 5/2011 | Anderson | H04L 9/3213 709/224 |
| 2012/0101985 | A1* | 4/2012 | Kemp | G06F 16/24565 707/609 |
| 2012/0173655 | A1* | 7/2012 | McEntee | G06F 16/1834 709/216 |
| 2013/0097626 | A1* | 4/2013 | Rajagopal | H04N 21/25875 725/25 |
| 2013/0227677 | A1* | 8/2013 | Pal | H04L 9/3228 726/19 |
| 2013/0239192 | A1* | 9/2013 | Linga | G06F 3/0482 726/7 |
| 2014/0040134 | A1* | 2/2014 | Ciurea | G06Q 20/383 705/44 |
| 2014/0165176 | A1* | 6/2014 | Ow | H04L 63/10 726/8 |
| 2019/0130115 | A1* | 5/2019 | Nagasundaram | G06F 21/60 |

* cited by examiner

*Primary Examiner* — Karen C Tang
(74) *Attorney, Agent, or Firm* — Innovation Partners LLC; Charles E. Gotlieb

(57) ABSTRACT

A system and method allows users of a social network system to view different types of information based on rights and privileges associated with the information and attributes and characteristics of each user.

20 Claims, 5 Drawing Sheets

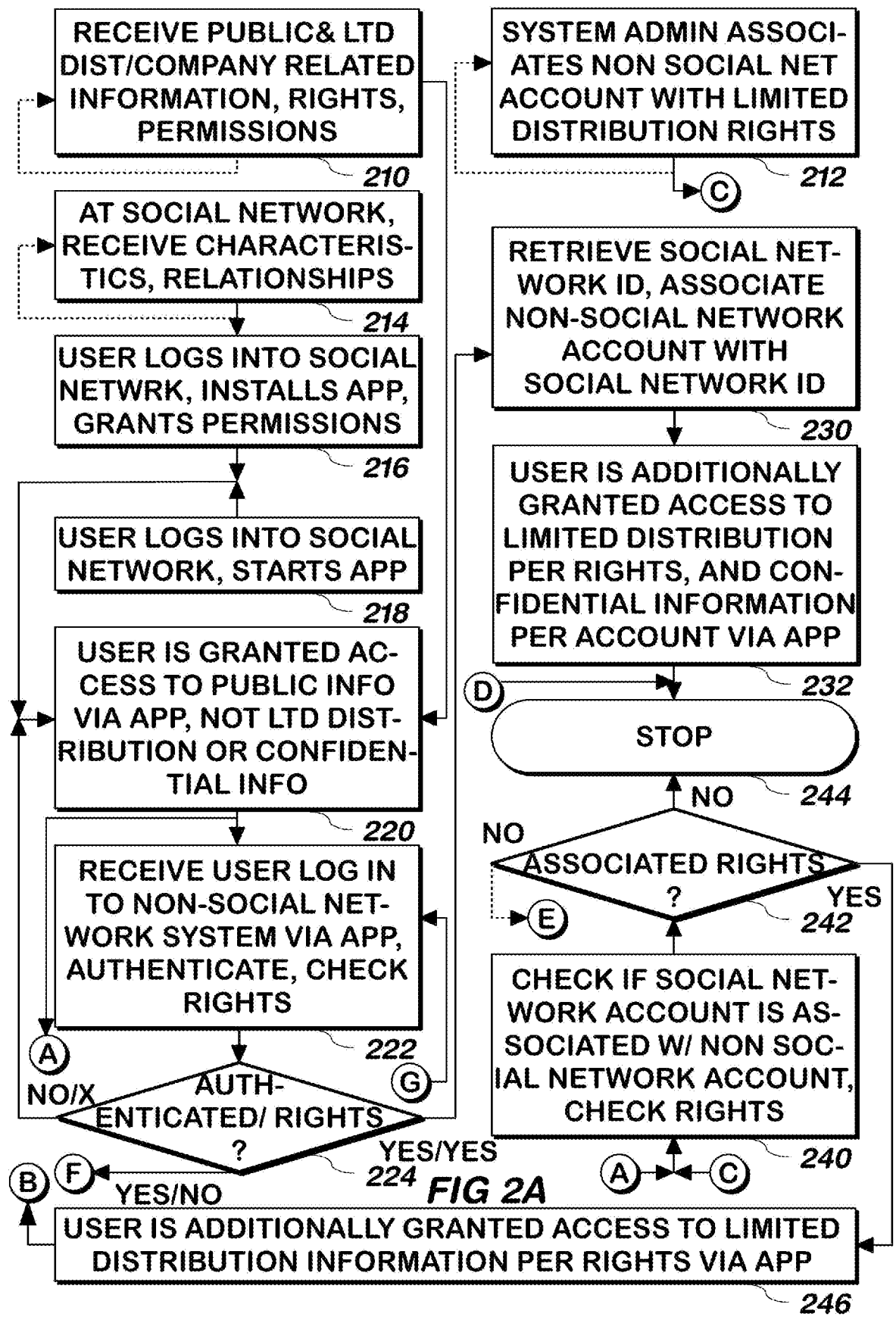

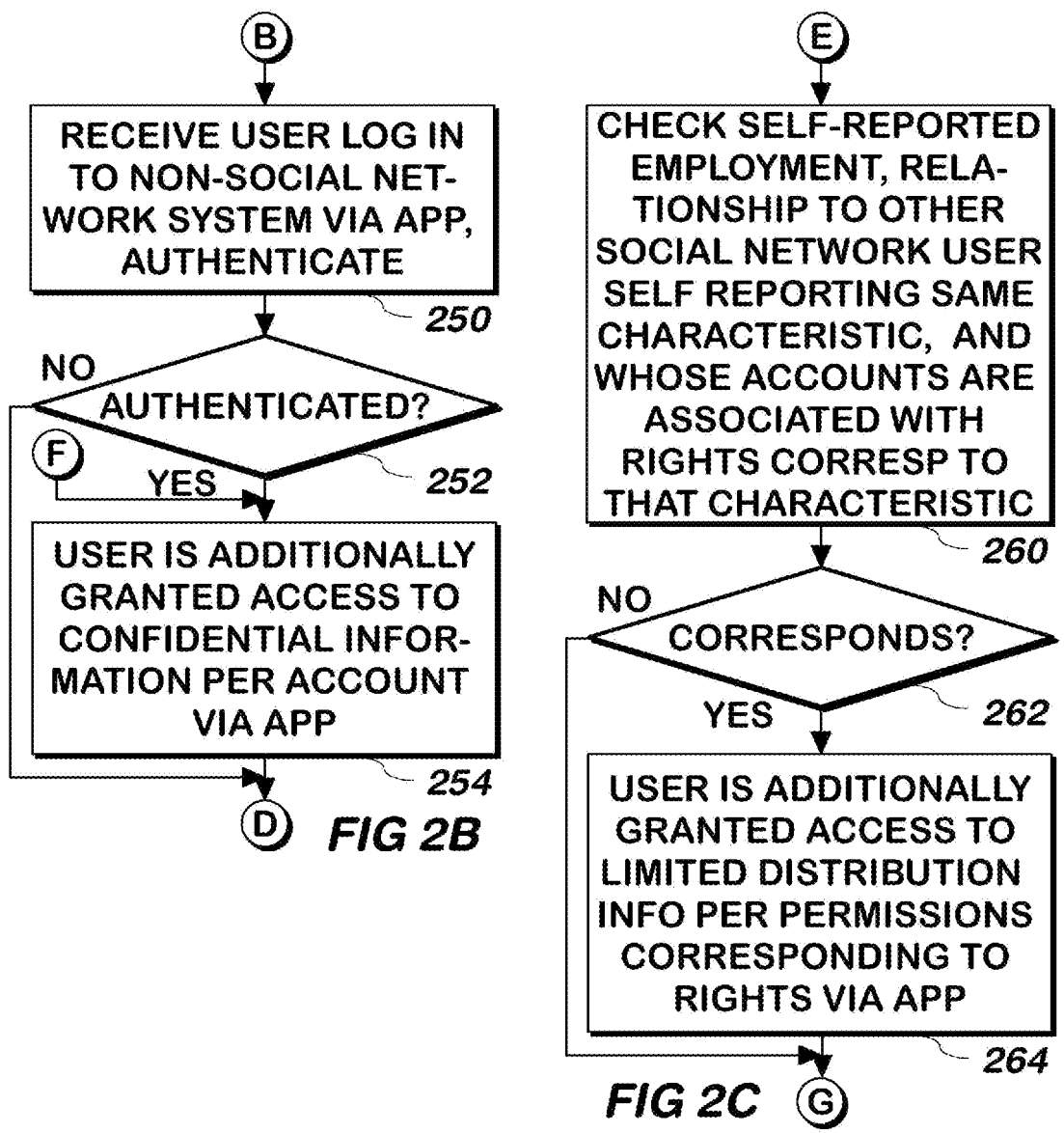

SYSTEM AND METHOD FOR SECURING INFORMATION PROVIDED VIA A SOCIAL NETWORK APPLICATION

RELATED APPLICATIONS

This application is a continuation of U.S. patent application Ser. No. 14/145,872 entitled, "System and Method for Securing Information Provided Via a Social Network Application" filed on Dec. 31, 2013 by Kenneth Michael Bravmann, Benjamin Noak Mattias, Jeffrey Michael Weaver, Sandeep Reddy, Chelamacherla Anand, John Murphy and Charles Gotlieb, which claims the benefit of U.S. Provisional Application Ser. No. 61/748,057 entitled, "Method and Apparatus for Securing Information Provided Via a Social Network Application" filed on Dec. 31, 2012 by Kenneth Michael Bravmann, Benjamin Noak Mattias, Jeffrey Michael Weaver, Sandeep Reddy Chelamacherla Anand, John Murphy, and Charles Gotlieb, each having the same assignee as the present application and each is hereby incorporated by reference in its entirety.

FIELD OF THE INVENTION

The present invention is related to computer software and more specifically to computer software for social network applications.

BACKGROUND OF THE INVENTION

Information may include publicly available information that can safely be made freely available to everyone without violating any confidences, as well as confidential information, which is information that should be held in confidence and provided only to one person or a very limited number of people. For example, general information about how to open an account at a financial institution may be considered to be publicly available information, while the account holdings of a single account at that financial institution may be considered to be confidential information to the account holder and the financial institution.

Another type of information is limited distribution information. Limited distribution information is information that may be safely disseminated to a class of users, and that may not be harmful to any one of those users if the information is distributed beyond those permitted to see it, but for which it is desirable to limit distribution only to that class or primarily to that class. For example, limited distribution information may include certain policies or procedures of a company that the company may not want to be known outside the class of people who are employees of the company. Limited distribution information is information for which limiting distribution of such information to the class is desirable.

In some cases, limiting distribution of such information to the class may be a goal, but one which, if not strictly met, is not considered to be harmful. For example, it may be permissible to distribute such information beyond the class as long as a reasonable attempt is made to prevent or limit such distribution beyond the class.

Social network applications may be used to disseminate information. Social network applications are applications that run under or in conjunction with a social network web site.

What is needed is a system and method that can provide such different types of information to appropriate individuals using a social network application.

SUMMARY OF INVENTION

Using the system and method of the present invention, a system administrator may grant rights to users of a "non-social network", which is defined herein to be any application that is not part of, or running under, a social network, and need not be a part of a network at all. The rights granted indicate which limited distribution information the user may view from a social network application. For example, in one embodiment, the rights granted to a user allow a user to see limited distribution information of one company among several companies for which limited distribution information may be received.

The system and method receives public, and limited distribution information, as well as a description of the rights users must possess in order to view each piece of limited distribution information.

The user may log in to a social network account at a social network, and "install" to their social network account an application that runs under the social network, as well as grant permissions to that application to view some or all of the information from the social network about the user, and optionally related users of that user. The user may then view the publicly available information supplied to the application.

If the user then uses the application to log in to their account at the non social network, the system and method associates any rights granted to such non social network account with the user's account at the social network. The user may then view the publicly available information, the limited distribution information that corresponds to the rights of that user on the non social network, and confidential information from their account at the non social network. If the user logs out of the application, and then logs in to the application at a later time, the application can use the rights previously associated with the account at the social network to allow the user to view the limited distribution information without logging in to the non social network an additional time. Confidential information would not be available to a user who had logged out of the application the next time the user used the application until the user again logged into his or her account at the non social network via the application.

The user may, however, log into the non social network from the application running under the social network in order to view confidential information, such as information that is specific to the account on the non social network. For example, the user may view account information such as account holdings corresponding to the non social network account. Whenever the user logs into their non social network account, including at the time the association described above is made, the user may be granted access to such confidential information.

In one embodiment, the limited distribution information may also be received with permissions. Permissions describe characteristics of users who, though they may not have rights to view the limited distribution information or have not yet associated their non social network account with their social network account by logging into their non social network account via the application as described above, should nevertheless be allowed to view it. In one embodiment, in addition to having the characteristics exhibited in their social network account that correspond to the permissions received for such limited distribution information, such user must be a friend of a user who already has associated their rights with their social network account identifier as described above, or exhibit a certain like or preference, or other characteristic. The permissions may specify self-described information from that user on the social network, such as listing an employer as the company for which the limited distribution information describes policies or procedures or other aspects of that company. Self-described information is information provided by that user himself, which can be considered to be verified based on the friendship with someone who already has rights to the same limited distribution information.

BRIEF DESCRIPTION OF THE DRAWINGS

FIG. 2, consisting of FIGS. 2A, 2B and 2C, is a flowchart illustrating a method of selectively providing information according to the rights and/or privileges of users according to one embodiment of the present invention.

DETAILED DESCRIPTION OF A PREFERRED EMBODIMENT

Figure 1:
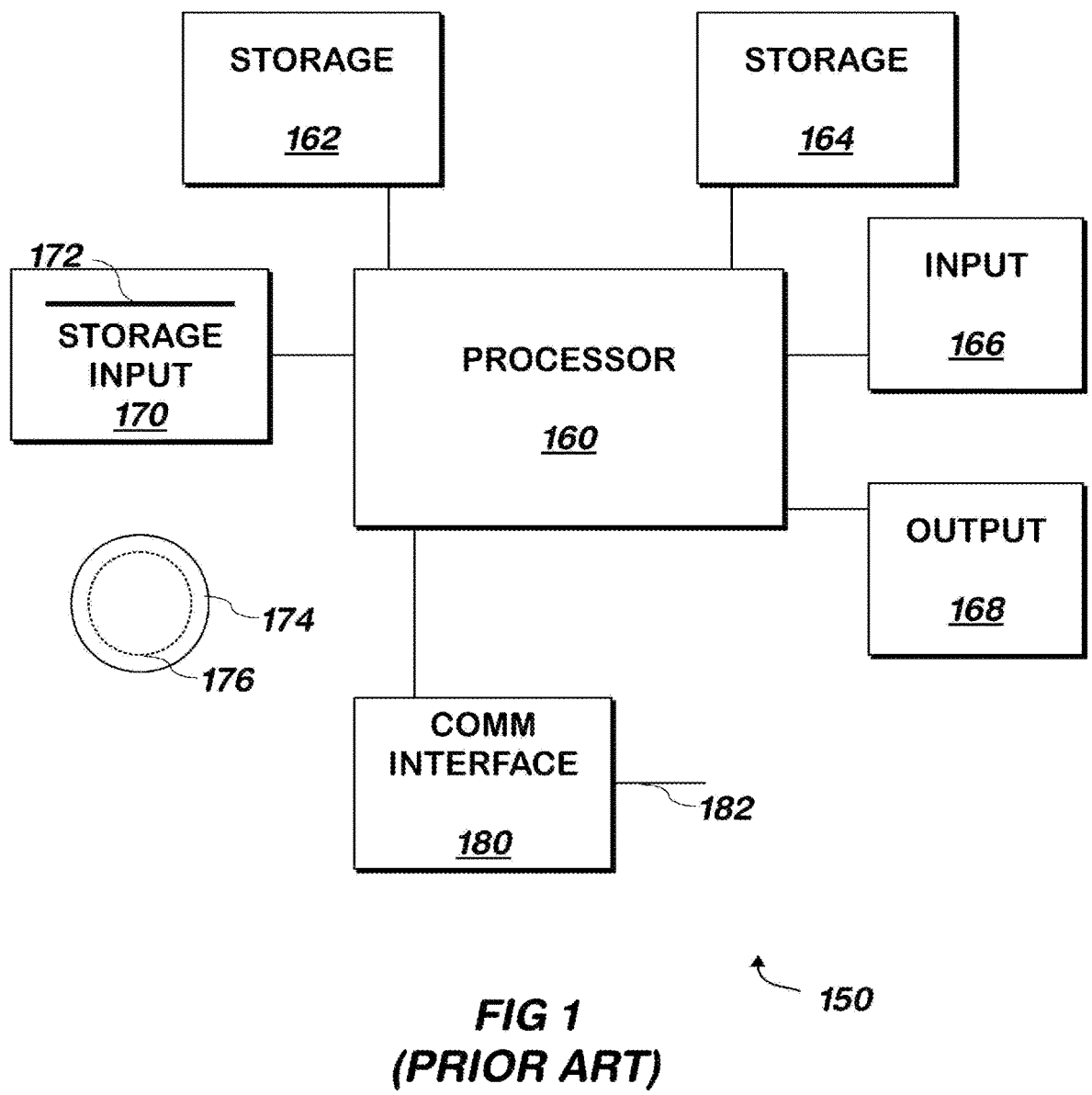
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Receive Public and Limited Distribution/Company Related Information, Rights, and Permissions.

At an application program, public information and limited distribution and/or company related information is received, such as from a system administrator, and any viewing rights and permissions information corresponding to such limited distribution and/or company-related information is also received 210. In one embodiment, public information includes one or more documents containing information that may be viewed by the general public without any special permissions or requirements. Limited distribution information may include one or more documents containing information for which viewing requirements are more restrictive than those necessary to view public information but less restrictive than the requirements to view high security or confidential information, which may include company-related information corresponding to any number of companies. Limited distribution information may be received as any number of limited distribution documents, each document associated one or more specific viewing rights. Viewing rights corresponding to a document may include one or more characteristics that are required of a user for the user to be granted access to view the document, and the viewing right or rights required to view a document may vary from document to document. For example, for Limited Distribution Document 1, the corresponding viewing rights for such document may include that the viewer owns an account of Type A at a non-social network associated with the application program and the account has been designated as one that is owned by an employee at Company X. For a Limited Distribution Document 2, the viewing rights information may require a viewer to have the same account type at the non-social network corresponding to the application and also be an employee at Company Y. Employees of Company X with the appropriate type of non-social network account may be granted access to view Document 1 but not granted access to view Document 2, and employees at Company Y with the appropriate type of non-social network account may be granted access to Document 2 but not Document 1. An employee at Company X that does not have the specified type of account at the non-social network may or may not be granted access to Document 1 or Document 2. In one embodiment, for a document associated with multiple viewing rights, a user with characteristics matching one viewing right may be granted access to view the document, or only a user with characteristics matching all viewing rights may be granted access to view the document.

In one embodiment, limited distribution documents may also be associated with permissions, which may give other users without the viewing rights required to view a document permission to view it nevertheless. Permissions information corresponding to limited distribution documents may include other characteristics information, such as any user characteristics provided by a user to his or her social network account, and which allow the user to view a limited distribution document for which the user is not granted viewing rights. For example, permissions information may permit a user to view Limited Distribution Document 1, even if the user does not own the specified type of non-social network account, if the user has reported to his or her social network that he/she is an employee at Company X, and if any of the user's social network connections (e.g. FACE-BOOK friends, if the social network is FACEBOOK) is also an employee at Company X and has had viewing rights corresponding to Company X and Document 1 associated with his/her social network account via the application.

Public information and limited distribution and/or company-related information, along with viewing rights and permissions information, may be received and/or updated at any time, and the process of receiving such information may be an independently operating process as shown by the dashed line in the Figure.

System Administrator Associates Non-Social Network Account with Limited Distribution Rights.

At the non-social network, non-social network accounts are associated 212, such as by a system administrator, with appropriate viewing rights corresponding to limited distribution information. Non-social network accounts may be accounts at any website operated by or for any entity independent from (not controlling or under control of) the entity that owns the social network. Viewing rights associated with any number of non-social network accounts may be received and/or updated at any time. In one embodiment, viewing rights granted to any user may also be revoked at any time, and the process of granting, associating, updating, and/or revoking any viewing rights associated with any non-social network account is an independently operating process as shown by the dashed line in the Figure.

At Social Network, Receive Characteristics, Relationships.

At a social network (e.g. FACEBOOK, LINKEDIN, etc.), user characteristics and social network relationships information is received 214 corresponding to any number of social network accounts. In one embodiment, user characteristics including user employment information and other user information describing one or more characteristics of the user, and social network relationships information including the social network connections (e.g. FACEBOOK friends, LINKEDIN connections, etc.) and types of connections (e.g. FACEBOOK family member, LINKEDIN recommended connection, etc.) corresponding to a social network account with respect to other social network accounts on the same social network are received from users at the social network via any conventional use of the network's social networking website, and such information is stored at the social network system. The process of receiving user characteristics information and social network relationships information at a social network may be an independently operating process as shown by the dashed line in the Figure.

User Logs Into Social Network Account, Installs Application, Grants Social Network Permissions.

A user may log in to the user's social network account using the user's social network account identifier and password and conventional log in techniques, the application may be installed to the user's social network account, such as by clicking a link to do so, and social network permissions are requested from, and may be granted by, the user to the application 216. "Social network permissions" are permissions granted to the application to retrieve or receive characteristics and/or connections information from the social network. In one embodiment, when social network permissions have been received by the application, then at any time, social network account information provided, or previously provided, to the social network by the user, including user characteristics information and social network relationships information may be requested from the user's social network by the application, and/or such information is received at the application. The social network permissions are those required to obtain the information from the social network as described herein.

User is Granted Access to Public Information Via Application, not Limited Distribution or Confidential Information.

Via the application, access to public information received from the non-social network is granted to the user, but no access to any limited distribution information or confidential information is yet granted to the user 220.

Receive User Login to Non-Social Network System Via Application, Authenticate, and Check Rights.

At any time, log in information corresponding to the user's non-social network account at the non-social network system may be received from the user at the non-social network system via the application, such information may be authenticated by the non-social network system, and if authenticated, the user's viewing rights with respect to limited distribution documents are checked at the non-social network system 222.

Not Authenticated (and X).

If the user's non-social network log in information is not authenticated at the non-social network system 224, then the method continues at step 218. In one embodiment, if the user's non-social network log in information is not authenticated as part of step 222, then the user's viewing rights with respect to limited distribution information do not change, and the method continues at step 220.

If Authenticated, and No Rights are Associated.

If the user's non-social network log in information is authenticated at the non-social network system, and no viewings rights are associated with the received log in information at the non-social network system 224, then the method continues at step 254.

If Authenticated, and Rights are Associated, then Retrieve Social Network Identifier, Associate Non-Social Network Account with Social Network Identifier.

If the user's non-social network account log in information is authenticated by the non-social network system, and if one or more viewing rights are associated with the user's non-social network account at the non-social network system 224, then the user's social network identifier is retrieved or received by the application, and such social network identifier is associated with the user's non-social network account at the application, and any rights information corresponding to the user's non-social network account are associated with the user's social network account identifier, also at the application 230, and the method continues at step 232.

User is Additionally Granted Access to Limited Distribution Per Rights and Confidential Information Per Account Via Application.

At step 232, in addition to the public information available to the user via the application as part of step 220, the user is also granted access to any limited distribution information which the user has the appropriate viewing rights, as well as any confidential information, such as information corresponding to the user's authenticated non-social network account. In one embodiment, one or more links may be provided to the user in order to grant the user access to limited distribution information and/or confidential information via the application, or the limited distribution and/or confidential information may be made accessible to the user in any other manner. The method continues at step 244.

User Logs into Social Network.

At any other time after the user has installed the application, the user may log into the user's social network account and the previously installed application is started 218.

When the user logs into his or her social network account and the previously installed application is started, access to any public information is granted to the user via the application in the manner described at step 220. The method additionally continues at step 240.

Check if Social Network Account is Associated with Non-Social Network Account, and Check Rights.

At step 240, a check is performed at the application to determine whether the user's social network account is associated with any non-social network account, and if so, if any viewing rights are associated with such non-social network account 240.

If Associated with a Previously Authenticated Non-Social Network Account, then User is Additionally Granted Access to Limited Distribution Information Per Rights Via Application.

If the user's social network account is associated with a non-social network account, and if one or more viewing rights are also associated with such social network account and non-social account 242, then additional access to limited distribution information is granted to the user per the viewing rights associated with the user's social network account via the application 246. The user need not log in to their non-social network account to obtain such rights.

Check Self-Reported Employment, Relationship to Other Social Network User Self Reporting Same Characteristic, and Whose Accounts are Associated with Rights Corresponding to that Characteristic.

In one embodiment, if the user's social network account is not associated with a non-social network account, or if there are no viewing rights associated with the user's social network account and associated non-social account 242, then permissions information corresponding to the user may be checked 260 to determine a correspondence with permissions received as described above. To check permissions information, any self-reported user characteristics information, such as self-reported employment information provided by the user to the user's social network (and which, therefore, may not be true), may be checked, as well as social network relationships information with respect to other social network accounts on the same social network that are reporting a matching user characteristic (e.g. matching employer information) and for which a non-social network account is associated and includes viewing rights corresponding to the matched user characteristic to determine if they match specifications for such items in any permissions received 260.

If Authenticated, User is Granted Access to Limited Distribution Information Per Permissions Corresponding to Rights Via Application.

If any permissions information corresponding to the user's social network account corresponds 262, then, in accordance with the viewing rights corresponding to such permissions information, the user may be granted access to limited distribution information via the application 264.

If not Authenticated.

If no permissions information corresponds to the user's social network account 262, then the method may continue at step 222.

Stop.

If no viewing rights have been identified corresponding to the user's social network account as described as part of step 242, and no permissions information corresponding to the user's social network account have been identified as described as part of step 262, then the user is not granted additional access to any limited distribution information via the application until any such viewing rights or permissions information are identified and/or authenticated corresponding to the user's social network account, and in one embodiment, the process of attempting to identify authenticated viewing rights and/or permissions information may be stopped 244.

Receive Log in to Non-Social Network System Via Application, Authenticate.

In one embodiment, following step 246, the user may request to view confidential information corresponding to the user's non-social network account by providing non-social network system log in information via the application. If the user requests to view confidential information corresponding to the user's non-social network account via the application by providing non-social network log in information, the user's non-social network system log in information is received at the non-social network system via the application in a manner similar to the manner described above, and an attempt is made to authenticate the received log in information 250.

If Authenticated, then User is Additionally Granted Access to Confidential Information Per Account Via Application.

If the user's non-social network log in information is authenticated via the application 252, then the user is additionally granted access to confidential information per the user's account via the application 254.

If Not Authenticated, Stop.

If non-social network log in information received from the user is not authenticated 252, then no access to any confidential information is granted to the user via the application until non-social network log in information provided by the user via the application is authenticated, and the process of attempting to authenticate the user's non-social network log in information may be stopped 244. In one embodiment, the user may still be granted access to public information, and may be additionally granted access to limited distribution information if viewing rights and/or permissions corresponding to the user and such limited distribution information are authenticated during the current log in session as described above.

Figure 3:
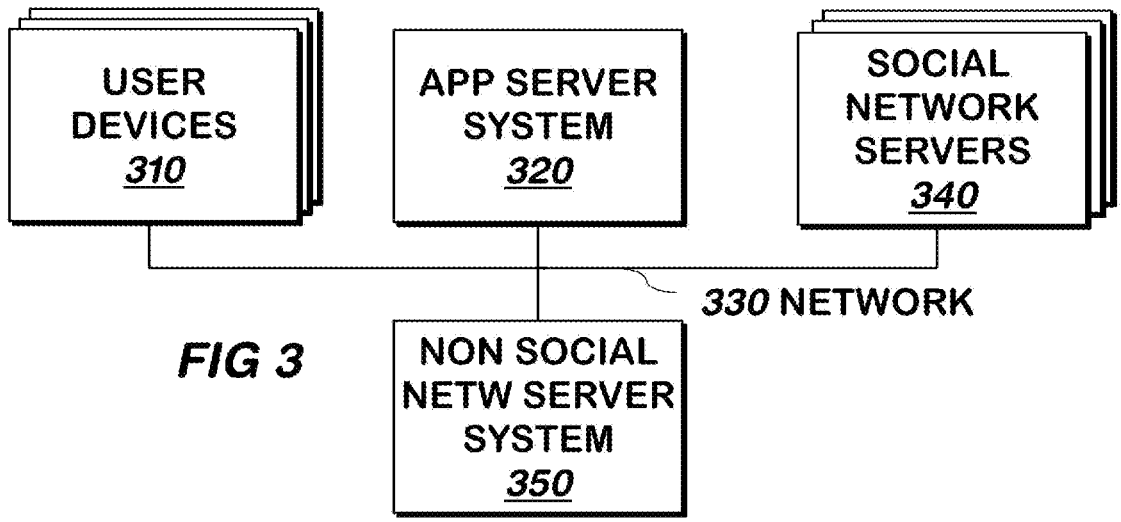
FIG. 3 is a block schematic diagram of a system for selectively providing different types of information according to the rights and/or privileges of users according to one embodiment of the present invention.

FIG. 3 is a block schematic diagram of a system for selectively providing different types of information according to the rights and/or privileges of users according to one embodiment of the present invention.

Figure 4:
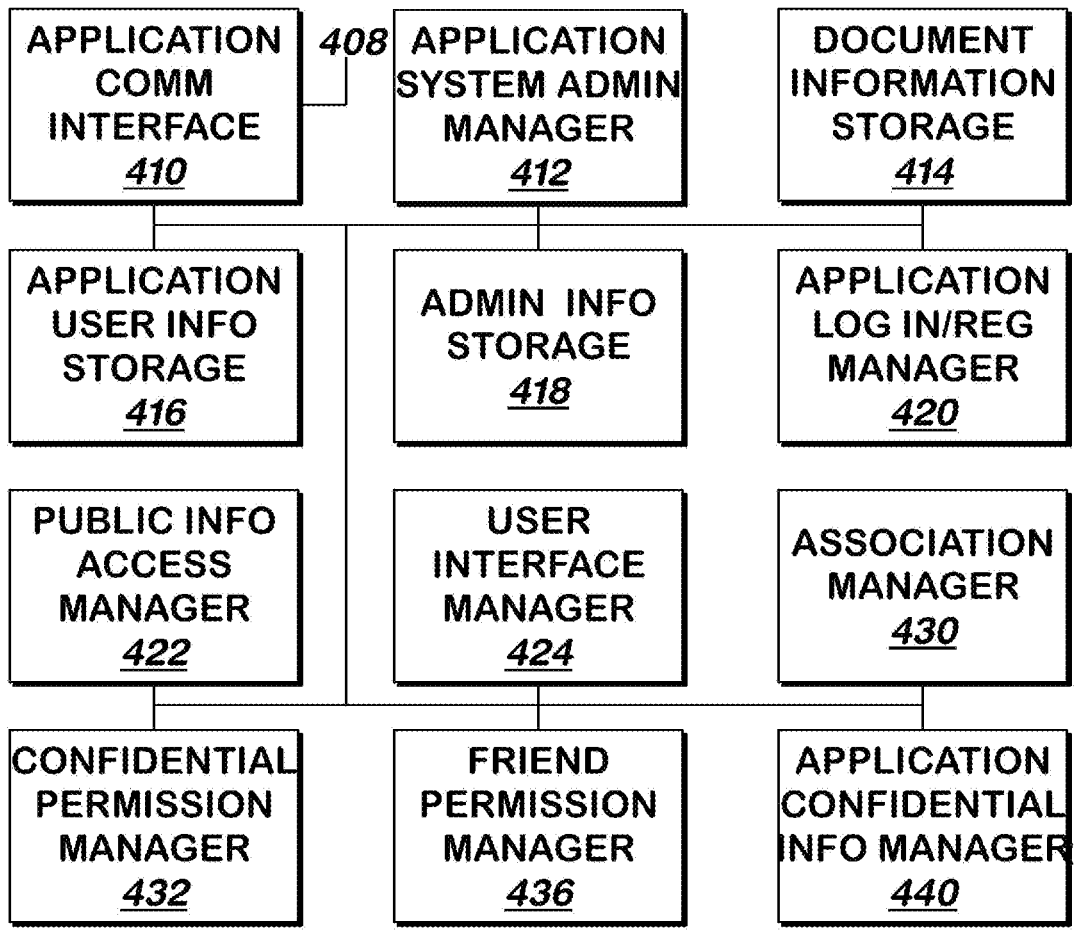
FIG. 4 is a block schematic diagram of an application server system of FIG. 3 shown in more detail according to one embodiment of the present invention.

FIG. 4 is a block schematic diagram of a representative application server system 320 of FIG. 3 shown in more detail according to one embodiment of the present invention.

Figure 5:
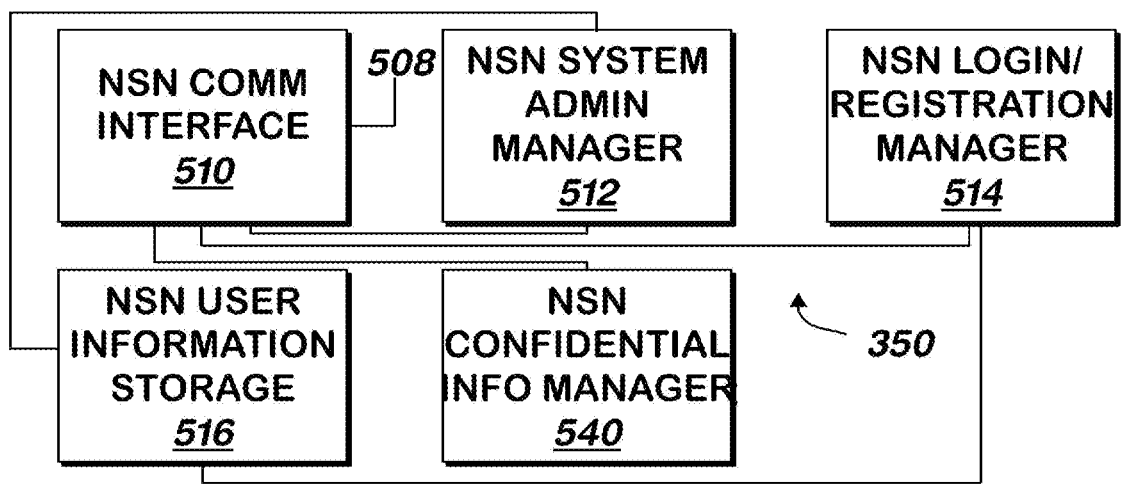
FIG. 5 is a block schematic diagram of a non social network server system of FIG. 3 shown in more detail according to one embodiment of the present invention.

FIG. 5 is a block schematic diagram of a representative non-social network server system 350 of FIG. 3 shown in more detail according to one embodiment of the present invention.

Referring now to FIGS. 3, 4, and 5, the system of FIG. 3 contains any number of user devices 310, which may include conventional personal computer systems, tablets, and smart phones, an application server system 320, any number of social network servers 340, and a non-social network server system 350, each of which may include conventional server computer systems, though other arrangements may be used. User devices 310, application server system 320 and social network servers 340 operate as described herein, and communicate with each other and with non-social network server system 350 via network 330, which may include a conventional Ethernet network, the Internet or both. Application server system 320 and non-social network server system 350 each include a communication interface 410 and 510, respectively, each of which may include a conventional communication interface running suitable communication protocols, such as Ethernet, TCP/IP or both. In one embodiment, unless otherwise noted herein, all communication in and out of both systems 320 and 350 are made via each system's respective input/output 408 and 508 of its respective communication interface 410 and 510. Other systems 310 and 340 are also coupled to network 330 via similar interfaces.

Non-social network server system 350 may contain subsystems (not shown) which may be used to run a conventional securities trading application via which users may view securities information such as quotes, trade securities, or perform any other actions, conventional securities information delivery and trading actions.

In one embodiment, at any time, a system administrator may use application administration manager 412 to define attributes, such as those that can be assigned to accounts to grant or deny access to public, limited distribution, or confidential information, and any other type of non-social network account information that can be assigned to any number of non-social network accounts, described above, and such information is received by NSN administration manager 512 and stored in admin information storage 418. For example, in one embodiment, the system administrator, using application administration manager 412, may define attributes including Employee At Company Alpha (EACA), Employed At Company Beta (EACB), Owns Account of Type A (OwnsA), and Owns Account of Type B (OwnsB). Application administration manager 412 receives any such attributes defined by the system administrator and stores each characteristic in admin information storage 418 associated with an attribute identifier.

Application system administration manager 412 also receives public information documents and limited distribution documents, including any company-related documents as described above, along with the viewing rights and/or permissions information corresponding to any limited distribution documents as described above. In one embodiment, viewing rights corresponding to any limited distribution document may be defined using any number of the attributes defined above by the system administrator and stored in document information storage 414 (e.g. EACA, EACB, OwnsA, OwnsB, etc.).

Permissions corresponding to any limited distribution document may be received as any combination of attributes, such as those associated with other users or other social network users, and any self-reported user characteristics or social network relationships, described above and in more detail below.

In one embodiment, application system administration manager 412 may receive public and/or limited distribution documents, each with the applicable viewing rights and/or permissions corresponding to each document, from a system administrator and/or non-social network server 350.

Application system administration manager 412 stores any documents received in document information storage 414 associated with a unique document identifier and any limited distribution rights and/or permissions corresponding to each document.

In one embodiment, user information storage 516 of NSN server system 350 may contain any conventional user account log in information corresponding to user accounts, including user identifier and password information and any other conventional information which may be used by registered non-social network account holders to allow such registered users to log in to non-social network server system 350 via non-social network log in/registration manager 514, and a system administrator may assign any number of attributes to any number of non-social network accounts in user information storage 516, as described above. For example, the system administrator may receive a list of employees at Company Alpha, from the company or from a authorized employee at the company, and assign the attribute EACA to any such employees included in such list. In one embodiment non-social network system administration manager 512 provides suitable user interface elements to allow the system administrator to provide such information assigning attributes to such non-social network accounts, which the system administrator provides, and non-social network system administration manager 512 receives, and non-social network system administration manager 512 may store any attribute assignments received, which may be identified using any number of attribute identifiers, in non-social network user information storage 516 associated with the non-social network account identifier(s) for which the attribute assignments have been received.

In one embodiment, non-social network system administration manager 512 may receive any additional, revoked, or changed or otherwise updated attribute assignments corresponding to any non-social network accounts in non-social network user information storage 516 at any time. In one embodiment, when non-social network system administration manager 512 receives any additional, revoked, or changed or otherwise updated attribute assignments corresponding to any non-social network accounts in non-social network user information storage 516, it may also initiate updating corresponding information, described in more detail below, in application user information storage 416 by providing such added, deleted, and otherwise updated attribute assignment information to application system administration manager 412, which receives the information and updates attributes assigned in application user information storage 416 accordingly.

Social network server 340 operates as described herein, receiving and storing social network user characteristics and social network relationships information corresponding to any number of social network accounts at any time.

Using a separate user device 310 that may include a conventional personal computer system with a conventional browser coupled to the Internet using suitable communication techniques, a user may log in to social network server 340 using any conventional log in techniques, such as via suitable user interface elements on a web page provided by social network server 340. When the user is logged in to the user's social network account on social network server 340, the user may install or register the application program at any time. To install or register the application, the user may click an install application button or link which specifies the application to install and grant permission to the application to access social network characteristic and relationship information the social network server. In one embodiment, social network server 340 receives the click and provides application registration information, which may include the user's social network user identifier and an application identifier to application log in/registration manager 420 of the application specified by the link clicked by the user. In one embodiment, social network server 340 and application server system 320 may communicate via conventional application program interface techniques.

Application log in/registration manager 420 receives the application registration information and registers the user as described above. To register a user, application log in/registration manager 420 may store the received social network account identifier in application user information storage 416. In one embodiment, social network server 350 may also request from the user, and receive from the user, any social network permissions corresponding to the installed application. Such social network permissions may include permissions from the user which allow social network server 350 to provide to the application some or all of the user's social network information, including self-reported user characteristics information such as employment information, social network relationships information, and any other information corresponding to the user's social network account as described above. Social network server 350 may internally store any social network permissions received associated with the received social network account identifier.

Application log in/registration manager 420 provides the received social network account identifier corresponding to the newly registered application user to public information access manager 422, which receives the social network account identifier and stores an indication in application user information storage 416, associated with the received social network account identifier, and such user is thereby granted access to public information. The user is not granted access to limited distribution information or confidential information at this time as described above.

The user may also request to provide non-social network log in information corresponding to the user's non-social network account via the application, such as by clicking a log in link provided by user interface manager 424. In one embodiment, when the user clicks the provided link, user interface manager 424 builds a web page which causes the user's browser to request user interface elements from non-social network log in/registration manager 514 to allow the user to provide non-social network user log in information as described above and return the information to non-social network log in/registration manager 514. In one embodiment, user interface manager 424 may build the web page to embed the user's social network account identifier, which it may first encrypt. In one embodiment, if the social network account identifier is encrypted, the encrypted social network account identifier may be stored in application user information storage 416 associated with the social network account identifier.

Non-social network log in/registration manager 514 receives the request including the encrypted social network account identifier and provides the user interface elements requested, which the user's browser displays. The user provides the non-social network log in information, and non-social network log in/registration manager 514 receives it and attempts to authenticate it. In one embodiment, non-social network log in/registration manager 514 checks a stored username and password database stored in non-social network user information storage 516 to attempt to authenticate log in information in a conventional manner. If non-social network log in/registration manager 514 authenticates the received non-social network log in information, non-social network log in/registration manager 514 stores the received encrypted social network account identifier in non-social network user information storage 516 associated with the received non-social network account identifier it authenticated, provides an indication to association manager 430 that the log in information is authenticated, and also checks non-social network user information storage 516 for any attributes associated with the authenticated non-social network account identifier.

If non-social network log in/registration manager 514 identifies any attributes associated with the authenticated non-social network account identifier, then non-social network log in/registration manager 514 additionally provides such attributes identified, including the attribute identifier corresponding to any such attribute identified, to association manager 430 along with the encrypted social network account identifier it received, and the indication that non-social network log in information is authenticated.

Association manager 430 receives the encrypted social network account identifier and indication that non-social network log in information corresponding to such encrypted social network account identifier has been authenticated, as well as any attributes information from non-social network log in/registration manager 514. In one embodiment, association manager 430 decrypts the encrypted social network account identifier it receives and records the authentication received, along with any attributes received, if any, in application user information storage 416 associated with the social network account identifier it has decrypted and the date and time when such authentication and attributes were received. In one embodiment, association manager 430 then signals user interface manager 424 with the (decrypted) social network account identifier.

At any subsequent time, as noted above, if non-social network system administration manager 512 receives any additional, revoked, or otherwise updated attribute assignments information corresponding to the non-social network account identifier in non-social network user information storage 516, then non-social network system administration manager 512, or non-social network log in/registration manager 514, may provide such updated attribute assignments to application system administration manager 412 or association manager 430 along with the encrypted social network account identifier stored in association with the non-social network account identifier in non-social network user information storage 516. An element of application server system 320, such as application system administration manager 412, may receive any such updated attribute assignments information, along with the encrypted social network identifier, and may update viewing rights information in application user information storage 416 per the updated viewing rights information received, as described above. In one embodiment, assignment information man include removal of one or more attributes and/or assignment of one or more other attributes.

If non-social network log in/registration manager 514 does not authenticate the non-social network log in information received from the user, it may provide an indication of such to association manager 430, such as an error message, or no response, or any other indication that non-social network information is not authenticated.

If non-social network log in/registration manager 514 does not identify any attributes associated with the authenticated non-social network account identifier, then in one embodiment, it may provide the encrypted social network account identifier it received to association manager 430 with no attribute assignments or an indication that no attributes are associated with such account identifiers.

User interface manager 424 receives the signal from association manager 430 along with a social network account identifier, and user interface manager 424 retrieves from application user information storage 416 any attributes associated with the social network user identifier, as well as the date and time corresponding to the last time non-social network log in information corresponding to the social network identifier was authenticated. In one embodiment, user interface manager 424 grants access to limited distribution documents in document information storage 414 according to any such attributes retrieved by providing for display to the user any number of links to the documents which may be viewed by a user according to the attributes retrieved and the permissions associated with each document if the permissions grant access to the document for users possessing the attributes or attributes the user has. If the user clicks any link to a document displayed by user interface manager 424, user interface manager 424 receives the click, identifies the document corresponding to the clicked link from document information storage 414, provides for display such document to the user in a conventional manner. As described above, user interface manager 424 does not display to the user any links corresponding to documents for which viewing rights corresponding to the document in document information storage 414 do not match the attributes assigned to the user's social network account identifier in application user information storage 416, or otherwise make such documents available to such user.

In one embodiment, if user interface manager 424 identifies in application user information storage 416 that the date and time of the last instance in which non-social network information corresponding to the received social network identifier was authenticated is within a threshold amount of time from the current date and time, user interface manager 424 may also grant the user access to confidential information by displaying to the user one or more links specifying application confidential information manager 440. If the user clicks such a link to display confidential information provided by user interface manager 424, application confidential information manager 440 receives the click and social network account identifier, and in one embodiment, application confidential information manager 440 may check that the date and time stored in application user information storage 416 that non-social network log in information corresponding to the received social network account identifier was authenticated is within a threshold amount of time from the current date and time, and if so, application confidential information manager 440 encrypts the received social network account identifier (or retrieve the previously encrypted social network account identifier from application user information storage 416) and sends a request for confidential information to non-social network confidential information manager 540 along with the encrypted social network account identifier. In one embodiment, user interface manager 424 may include an encrypted version of the user's social network account identifier with the displayed link via conventional URL parameter passing techniques or application confidential information manager 440 requests the user's social network account identifier from social network server 340.

Non-social network confidential information manager 540 receives the request for confidential information and encrypted social network account identifier, identifies the non-social network account corresponding to the received encrypted social network account identifier, and provides to application confidential information manager 440 the requested confidential information corresponding to such non-social network account, which may include current and/or previous information with respect to securities such as stock, bonds, options, or any other type of market funds held by the user, or any other account information or confidential non-social network information, or any other information, along with the received encrypted social network account identifier.

Application confidential information manager 440 receives the requested confidential information and encrypted social network account identifier, decrypts the identifier, stores the received confidential information in application user information storage 416 associated with the social network account identifier, and signals user interface manager 424 to display confidential information, along with the decrypted social network account identifier. In one embodiment, application confidential information manager 440 may store the confidential information as text information, or as text information and instructional information including how user interface manager 424 can display and/or update and display the text information (e.g. amount of stock owned by the user and a stock ticker symbol)

User interface manager 424 receives the signal and social network account identifier from application confidential information manager 440, and user interface manager 424 displays the requested confidential information. In one embodiment, user interface manager 424 may display the confidential information as text, such as by displaying the number of shares of Stock X are owned and the last closing price per share of such stock). In one embodiment, user interface manager 424 may perform calculations using confidential information to display the information. For example, to display positions information corresponding to shares of stock held in the user's non-social network account, user interface manager 424 may identify the quantity of shares of a stock held by a user from the confidential information stored associated with the user's social network identifier in application user information storage 416, multiply such quantity of shares identified times the current price per share of such stock (which it may retrieve, receive, or identify from a conventional security quotation server in any conventional manner), and subtract such product from the product of the identified quantity of shares of such stock held by the user multiplied times the previous day's closing price per share of such same stock, which user interface manager 424 may retrieve, receive, or identify from application user information storage 416 or the security quotation server or in any other conventional manner in order to display the change in value from the previous day's closing value. User interface manager 424 may display the confidential information corresponding to the user's non-social network account in any other manner.

After the initial installation of the application, the user may log in to the user's social network account on social network server 340 at a later time via conventional log in techniques (e.g. by providing a social network identifier and password), and the logged in user may start the application as described above. If the user starts the application, such as by clicking a link to the application displayed by social network server 340, social network server 340 may provide the user's social network identifier to application log in/registration manager 420, which receives the user identifier, identifies the user as an application user by checking application user information storage 416, and grants the user access to public information via the application as described above.

In one embodiment, user interface manager 424 checks if the user's social network account is associated with any non-social network account as described above, and if so, user interface manager 424 checks attributes corresponding to the non-social network account as described above. In one embodiment, user interface manager 424 identifies the user's social network account identifier in application user information storage 416 and checks for any attributes associated with such social network account identifier as described above. If user interface manager 424 identifies any such attributes in application user information storage 416, then it may additionally grant the user access to limited distribution information per the attributes associated with the user's social network identifier as described above and the rights of the limited distribution information. In one embodiment, user interface manage 424 grants the user access to limited distribution information in a manner similar to the manner in which user interface manager 424 grants access to limited distribution information above, such as by displaying links corresponding to documents in document information storage 414 for which the viewing rights match the user's assigned attributes in application user information storage 416, receiving any user clicks on such displayed links, and displaying documents from document information storage 414 corresponding to any received clicks.

A user that has been granted permission to view public information and limited distribution information according to attribute identifiers previously associated with the user's social network account identifier in application user information storage may also request to additionally view confidential information as described above, for example via a link user interface manager 424 displays if the user's last authentication was within a threshold amount of time. If more than such threshold amount of time has elapsed, at any time while the user is logged in to the user's social network and also has started the application as described above, the user may request to view confidential non-social network information corresponding to the user's non-social network account via the application, such as by requesting to provide the user's non-social network account user identifier and password as described above. In one embodiment, the user may request to provide such non-social network user identifier and password by clicking a log in link corresponding to the user's non-social network account which may be provided by user interface manager 424. When the user clicks such a link, user interface manager 424 receives the click and may build a web page that causes the user's browser to request a log in web page, or request suitable user interface elements to allow the user to provide non-social network log in information, from non-social network log in/registration manager 514.

In one embodiment, user interface manager 424 builds the web page to include the user's social network account identifier, which may be encrypted, such as by using conventional URL parameter passing techniques or via conventional form variable submissions techniques. NSN log in/registration manager 514 receives the request, along with the encrypted social network account identifier, and provides the suitable user interface elements to allow the user to provide non-social network user identifier and password. The user provides the non-social network log in information to non-social network log in/registration manager 514, which receives the information, and attempts to authenticate it, such as via conventional log in techniques. If non-social network log in/registration manager 514 does not authenticate the non-social network log in information, then the user is not granted access to any non-social network confidential information until such log in information is authenticated. In one embodiment, non-social network log in/registration manager 514 may provide an indication to user interface manager 424 that received non-social network log in information is not authenticated.

If non-social network log in/registration manager 514 determines that the non-social network log in information is authenticated, it provides an indication of such to confidential permission manager 432 along with the encrypted social network account identifier.

Confidential permission manager 432 receives the indication that non-social network account information is authenticated and the encrypted social network account identifier, decrypts the encrypted social network account identifier, and logs the date and time when such authentication indication was received in application user information storage 416 associated with the decrypted social network account identifier. In one embodiment, confidential permission manager 432 signals user interface manager 424 along with the (decrypted) social network account identifier, and user interface manager 424 receives the signal and social network account identifier, grants access to, and provides for display confidential information to the user in the manner described above.

A user may also log in to social network server 340, start the application, may not provide non-social network log in information, and/or may not have any attribute identifiers associated with his/her social network account as described above. If such a user is logged in to social network server 340 and has started the application, and user interface manager 424 does not identify any attributes associated with the user's social network account identifier in application user information storage 416, user interface manager 424 may not display any links to any limited distribution information or otherwise grant access to limited distribution information at that time.

In one such embodiment, in such event, user interface manager 424 may signal friend permission manager 436 with such user's social network account identifier.

Friend permission manager 430 receives the social network account identifier and attempts to authenticate permissions information corresponding to the received identifier as described above. To authenticate permissions information, friend permission manager 436 checks social network server 350 for any self-reported user characteristics information that corresponds to any permissions associated with documents stored in document information storage 414, such as self-reported employment information or information corresponding to the user's social network interests and/or likes, corresponding to the received social network account identifier which may comprise any possible limited distribution document permissions, as well as any social network relationships information corresponding to such social network account identifier with respect to any other social network accounts reporting characteristics information that may match one or more aspects of such possible permissions, as described above. In one embodiment, friend permission manager 436 requests such self-reported user characteristics information and social network relationships information from social network server 350 along with the received social network account identifier, and friend permission manager 436 receives the requested information. Friend permission manager 430 retrieves any permissions information corresponding to identified social network friends in application user information storage 416.

If friend permission manager 436 identifies any authenticated permissions corresponding to the social network account identifier as described above, it stores such permissions information in application user information storage 416 along with the social network account identifier for which such permissions were identified, and friend permission manager 436 provides a signal to user interface manager 424 that friend permissions have been identified, along with the received social network account identifier. User interface manager 424 receives the social network account identifier, identifies any permissions information associated with the social network account identifier in application user information storage 416, and provides any number of links to documents for which the social network information retrieved for the user and rights information of the user's friends corresponds to information to such permissions in a manner similar to the manner above in which it provides access to limited distribution information to users permitted to view such limited distribution information. In one embodiment, user interface manager 424 retrieves any documents corresponding to permissions information from document information storage 414.

For example, if a user has a self-reported characteristic and the user's friend has rights to a document, if the permissions for the document requires both such things, the user is given access to the document, even though the user does not have rights to view the document. If no permissions are identified for the document, or social network information and rights of the user's friends do not match the permissions corresponding to the document, the user is not granted access to the document by user interface manager 424.

There may be any number of users and documents of any number of organizations, using any number of rights and permissions, and any number of attributes and characteristics.

What is claimed is:

1. A method of providing a plurality of sets of information providing information to a plurality of users of a social network server, the method comprising:
   receiving the plurality of sets of information to be provided to the plurality of users of the social network server;
   assigning one of a plurality of types to each of the sets of information in the plurality received, the types comprising a first type, a second type and a third type;
   providing to at least one first user in the plurality, by a system operated independently of the social network server, via at least one first connection initiated in a manner involving the social network server, at least one of the plurality of sets of information assigned the first type, without regard to whether said at least one first user is, or had been, logged in to the system;
   providing by the system to at least one second user in the plurality, via at least one second connection initiated in a manner involving the social network server, at least one of the plurality of sets of information assigned the second type, responsive to such at least one second user being, at a first time of such providing, logged in to the system via authentication information provided to the system, where such authentication information was provided to such system via at least one of the at least one second connection; and
   providing to at least two third users, by the system, via at least two third connections, each initiated in a manner involving the social network server, at least one of the plurality of sets of information assigned the third type:
      responsive to at least one of such third users being, at a second time of such providing, at least one user in the plurality who is currently logged in to the system via authentication information provided to the system via one of the at least two third connections established to the system via the social network server; and
      responsive to a different at least one of the third users being, at a third time of such providing, at least one user in the plurality who had previously logged in to the system via a username and a password provided to the system via at least one fourth connection established to the system via the social network server, but is not currently logged into the system.

2. The method of claim 1, wherein the third type is assigned to at least one set of information in the plurality that comprises a policy of a company or a procedure of the company.

3. The method of claim 2:
   additionally comprising assigning at least one of a plurality of rights to each of at least some of the plurality of users, at least one of the plurality of the rights being assigned to at least one of the users in the plurality responsive to a relationship each of said at least one user has with the company; and
   wherein:
   the providing via at least one of the at least two third connections is additionally responsive to any rights assigned to said at least one of the third users to which the at least one set of information is provided.

4. The method of claim 2, wherein the at least one of the plurality of sets of information assigned the third type is additionally provided to at least one user in the plurality who has at least one attribute at the social network server that corresponds to a permission corresponding to a set of information assigned the third type being provided to that respective user.

5. The method of claim 4, wherein at least one of the at least one attribute is a relationship on the social network server with a user who can view the at least one set of information provided to the at least one user in the plurality who has the at least one attribute.

6. The method of claim 5, wherein at least one of the at least one attribute of the at least one user in the plurality who has the at least one attribute comprises a self-described attribute of that user on the social network server.

7. The method of claim 1, wherein at least two of:
   the at least one first connection;
   the at least one second connection;
   the at least one third connection; and
   the at least one fourth connection comprises a same connection.

8. A system for providing a plurality of sets of information to a plurality of users of a social network server, the system comprising:
   a system administration manager comprising a hardware computer processor system coupled to a memory system, and having an input coupled for receiving the plurality of sets of information to be provided to the plurality of users of the social network server, and for assigning one of a plurality of types to each of the sets of information in the plurality received, the types comprising a first type, a second type and a third type, and for providing at an output each of the sets of information and its respective type assigned;

a public information access manager comprising the hardware computer processor system coupled to the memory system, operated independently of the social network server, and having an input coupled to the system administration manager output for receiving at least one of the plurality of sets of information assigned the first type, the public information access manager for providing at an output to at least one first user in the plurality, via at least one first connection initiated in a manner involving the social network server, at least one of the at least one of the plurality of sets of information assigned the first type, without regard to whether said at least one first user is, or had been, logged in to the system;

a confidential information manager comprising the hardware computer processor system coupled to the memory system, for providing at an output, a first authorization to view at least one of the plurality of sets of information assigned the second type, for at least one user in the plurality, the first authorization having a first state and a second state, responsive to an indication received at an input that indicates such at least one user being, at a first time of such providing, logged in to the system via authentication information provided to the system, wherein such authentication information was provided to such system via at least one second connection established to the system in a manner involving the social network server;

a log in registration manager comprising the hardware computer processor system coupled to the memory system, the log in registration manager for providing at an output:
  a second authorization to view at least one of the plurality of sets of information assigned the third type, for at least one third user in the plurality, the second authorization having a first state and a second state, responsive to such at least one third user being, at a second time of such providing, at least one user in the plurality who is currently logged in to the system via authentication information received at an input via a third connection initiated by the system via the social network server; or
  a third authorization to view at least one of the plurality of sets of information assigned the third type, for at least one fourth user in the plurality, the third authorization having a first state and a second state, responsive to such at least one fourth user being, at a third time of such providing, at least one user in the plurality who had previously logged in to the system via authentication information received at the log in registration manager input via a fourth connection established to the system via the social network server, but is not currently logged into the system; and a user interface manager having an input coupled to the confidential information manager output for receiving the first authorization and to the log in registration manager output for receiving the second authorization and the third authorization and coupled to the system administration manager output for receiving at least one of the plurality of sets of information assigned the second type and third type, the user interface manager for providing at an output to the at least one second user in the plurality the at least one of the plurality of sets of information assigned the second type responsive to the first authorization having the first state, for providing at the user interface manager output to the at least one third user in the plurality the at least one of the plurality of sets of information assigned the third type responsive to the second authorization having the first state, and for providing at the user interface manager output to the at least one fourth user in the plurality the at least one of the plurality of sets of information assigned the third type responsive to the third authorization having the first state.

9. The system of claim 8, wherein the third type is assigned to at least one set of information in the plurality that comprises a policy of a company or a procedure of the company.

10. The system of claim 9, wherein:
the system administration manager is additionally for receiving at the system administration manager input, and for providing at the system administration manager output:
  a first association of at least one of a plurality of rights with each of at least some of the plurality of users, at least one of the plurality of rights being assigned to at least one of the users in the plurality responsive to a relationship each of said at least one user has with the company; and
  a second association of each of the plurality of rights with at least one of the plurality of sets of information; and
the user interface manager input is additionally for receiving any rights associated with the at least one third user and the at least one fourth user to which each of the at least one set of information is provided, and the user interface manager provides at the user interface manager output the at least one of the plurality of sets of information having the third type additionally responsive to any rights associated with:
said at least one third user or fourth user to which the at least one set of information is provided; and
said at least one set of information.

11. The system of claim 8:
wherein:
  the system administration manager is additionally for receiving at the system administration manager input, and for providing at the system administration manager output;
  at least one permission comprising an attribute on the social network server of at least one user of the social network server who can interact with at least one set of information assigned the third type even if said at least one user of the social network server is not in a group of users comprising the at least one third user and the at least one fourth user; and
  at least one association of each of the at least one permission with at least one of the plurality of sets of information;
additionally comprising a friend permissions manager having an input for receiving from the system administration manager output said at least one permission and said at least one association of each of the at least one permission, and for receiving from the social network server a value of each of the at least one attribute of a fifth user of the social network server, the friend permission manager for providing at an output a fourth authorization to view at least one of the sets of information assigned the third type, the fourth authorization having a first state responsive to the value of the at least one attribute of the fifth user corresponding to the permission, and a second state; and wherein:

the user interface manager input is additionally coupled to the friend permissions manager for receiving the fourth authorization; and the user interface manager additionally provides at the user interface manager output to the fifth user at least one of the plurality of sets of information assigned the third type responsive to the fourth authorization having the first state.

12. The system of claim 11, wherein at least one of the at least one attribute is a relationship on the social network server with a user of the social network server who can view the at least one set of information provided to the fifth user of the social network server.

13. The system of claim 12, wherein at least one of the at least one attribute of the fifth user comprises a self-described attribute of that user on the social network server.

14. A computer program product comprising a non-transitory computer useable medium having computer readable program code embodied therein for providing a plurality of sets of information providing information to a plurality of users of a social network server, the computer program product comprising computer readable program code devices configured to cause a computer system to:

receive the plurality of sets of information to be provided to the plurality of users of the social network server;

assign one of a plurality of types to each of the sets of information in the plurality received, the types comprising a first type, a second type and a third type;

provide to at least one first user in the plurality, by a system operated independently of the social network server, via at least one first connection initiated in a manner involving the social network server, at least one of the plurality of sets of information assigned the first type, without regard to whether said at least one first user is, or had been, logged in to the system;

provide by the system to at least one second user in the plurality, via at least one second connection initiated in a manner involving the social network server, at least one of the plurality of sets of information assigned the second type, responsive to such at least one second user being, at a first time of such providing, logged in to the system via authentication information provided to the system, where such authentication information was provided to such system via at least one of the at least one second connection; and provide to at least two third users, by the system, via at least two third connections, each initiated in a manner involving the social network server, at least one of the plurality of sets of information assigned the third type:

responsive to at least one of such third users being, at a second time of such providing, at least one user in the plurality who is currently logged in to the system via authentication information provided to the system via one of the at least two third connections established to the system via the social network server; and responsive to a different at least one of the third users being, at a third time of such providing, at least one user in the plurality who had previously logged in to the system via a username and a password provided to the system via at least one fourth connection established to the system via the social network server, but is not currently logged into the system.

15. The computer program product of claim 14, wherein the third type is assigned to at least one set of information in the plurality that comprises a policy of a company or a procedure of the company.

16. The computer program product of claim 15:

additionally comprising computer readable program code devices configured to cause the computer system to assign at least one of a plurality of rights to each of at least some of the plurality of users, at least one of the plurality of the rights being assigned to at least one of the users in the plurality responsive to a relationship said user has with the company; and wherein:

the computer readable program code devices configured to cause a computer system to provide via at least one of the at least two third connections are additionally responsive to any rights assigned to said at least one of the third users to which the at least one set of information is provided.

17. The computer program product of claim 15, wherein the at least one of the plurality of sets of information assigned the third type is additionally provided to at least one user in the plurality who has at least one attribute at the social network server that corresponds to a permission corresponding to a set of information assigned the third type being provided to that respective user.

18. The computer program product of claim 17, wherein at least one of the at least one attribute is a relationship on the social network server with a user who can view the at least one set of information provided to the at least one user in the plurality who has the at least one attribute.

19. The computer program product of claim 18, wherein at least one of the at least one attribute of the at least one user in the plurality who has the at least one attribute comprises a self-described attribute of that user on the social network server.

20. The computer program product of claim 14, wherein at least two of:

the at least one first connection;

the at least one second connection;

the at least one third connection;

and the at least one fourth connection comprises a same connection.

* * * * *